United States Patent Office 3,347,083
Patented Oct. 17, 1967

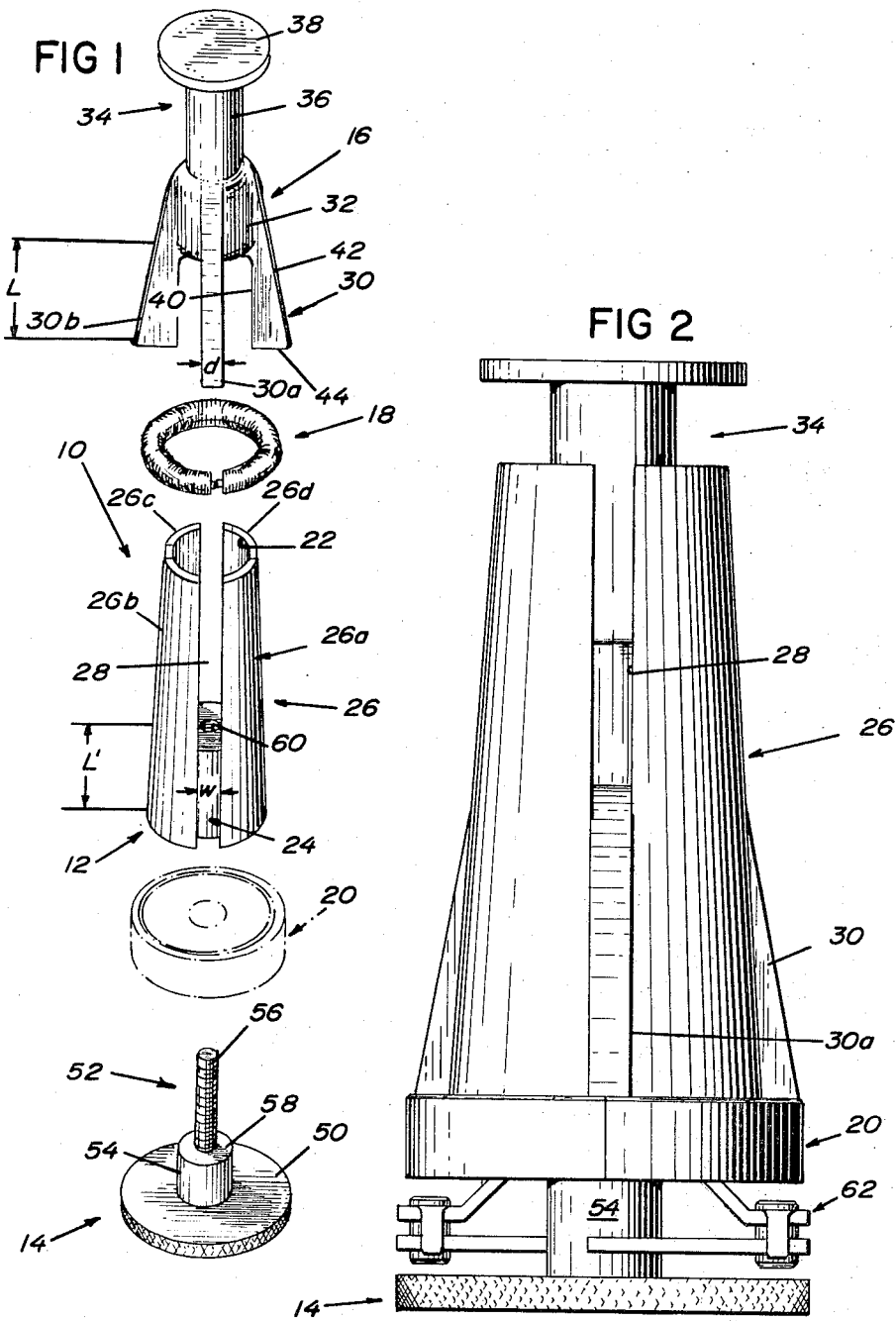

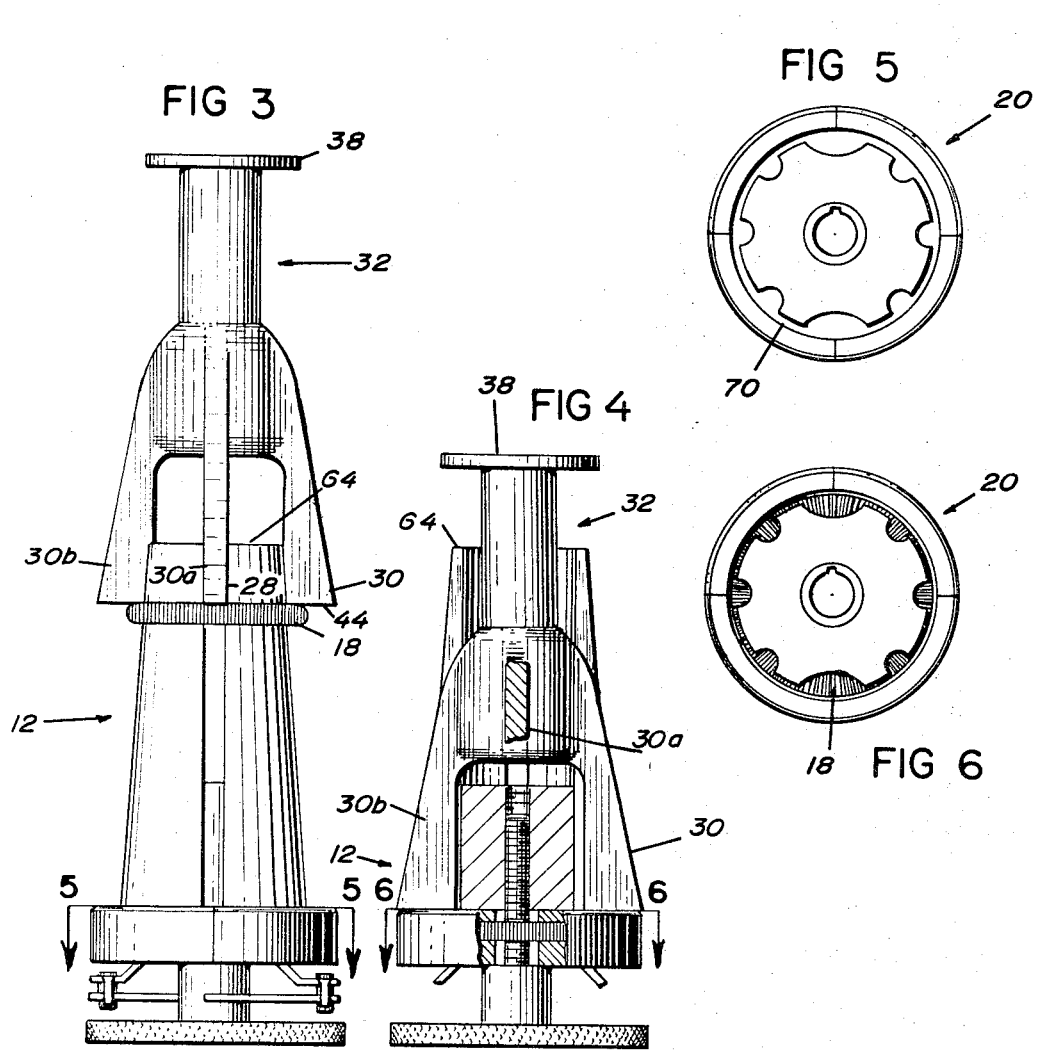

3,347,083
APPARATUS FOR EXPANDING AN ELASTIC LOOP MEMBER AND MOVING THE SAME TO A GIVEN POSITION
William V. Turpin, Rte. 4, and Ollie E. Lotts, Rte. 4, Box 17-B, both of Lexington, Va. 24450
Filed Aug. 25, 1965, Ser. No. 482,570
7 Claims. (Cl. 72—393)

This invention relates generally to tools and is particularly concerned with a device which can be used to easily expand an elastic loop member such as a coil spring formed into a loop and then move the same to a given position. The invention finds particular utility when employed for purposes of placing a coil spring which has been formed into a loop in the spring-receiving recess of a centrifugal clutch, and accordingly will be described hereinafter when used for such purpose. However, it is to be understood at the outset that the device hereof is not limited to this particular application or use, and instead has diverse application or uses wherever a loop type elastic member must be expanded and positioned.

Considering first the background of the invention particularly as related to the insertion of springs in centrifugal clutches, it is helpful to briefly outline the centrifugal clutch arrangement conventionally employed. A centrifugal clutch of conventional design includes a plurality of members, usually pie shaped, which are adapted to be assembled together to form a circular element. Each of the pie shaped members has an arcuate recess therein whereby, when the members are assembled, a circular recess is formed in the clutch assembly. A coil spring having its ends connected together is inserted in such recess to hold the pie shaped members in the assembled arrangement. As the then assembled clutch rotates, centrifugal force tends to expand the assembly under the restraint of the spring which returns the pie shaped clutch members to their initial "closed" position whenever the centrifugal force is not acting thereon.

To achieve the foregoing result, it is necessary to initially place the spring in the aforesaid circular recess in an expanded or tensioned condition. Since the spring is normally an elongated coil spring, and since its ends are connected together before inserting the same in the clutch recess, the spring usually does not assume an initial circular configuration. Because of this factor and further because the spring must be expanded or tensioned, a worker finds difficulty in getting the spring into proper position. It is customary, in fact, to place the clutch parts in assembled condition without the spring and to then hold such parts in a vise. Then, with one or more screwdrivers the worker attempts to expand and position the spring in the clutch recess formed by the arcuate recesses in the then assembled pie shaped member. This operation is both time consuming and difficult, yet it remains existent because of the lack of any suitable tool or device heretofore.

The present invention has as its primary object the provision of a tool or device which will permit an operator to easily, automatically and quickly insert a spring such as described above in a clutch recess such as also described above. Further, however, it is an object hereof to provide such a tool or device which can be used for this purpose as well as various other purposes and whenever it is desired to expand and position an elastic loop member.

While we are not aware of any previous tool or device which is intended to be used for the purpose of inserting a clutch spring in a centrifugal clutch recess easily, automatically and quickly, there have been prior suggestions of tools which allegedly operate to expand and position closed elastic loops. These prior suggestions, however, failed to meet the requirements of stability, simplicity and repeated trouble-free operation. Further, they appear to present a severe obstacle to widespread use since they fail to permit an operator to visually observe the spring as it is expanded and positioned.

By way of example, some prior devices incorporate a truncated frustro-conical support and a cup-shaped member adapted to move thereover. The cup-shaped member has an abutment or flange on the interior thereof which engages the elastic loop to be expanded or positioned. However, the cup-shaped member hides the elastic loop during operation thus preventing the operator from observing a defect therein during expansion. Even further, the limited stability of such unit is achieved by incorporating a screw to move the cup member, thus making the operation slow.

In another type of prior unit, a screw is used to move a loop-engaging support means whereby the same presses the loop over a frustro-conical support or base. The support means, in this instance, includes a plurality of pivotally mounted arms which lock onto the loop to be expanded and which are guided in channels in the support or base. Engaging the element itself with a "lock-on" type hook or element presents the possibility of damage to the elastic loop, using a screw slows down the operation, and incorporating pivotally movable arms substantially decreases the stability and presents an area for wear and resultant problematical operation.

In contrast with the prior suggestions outlined above, the present invention does not incorporate any screw or pivotal arms and further it permits an operator to visually inspect an elastic loop being expanded and positioned during the expansion thereof. Viewed in this respect, a significant object of the present invention is to provide a simple tool or device comprising very basic cooperating members which virtually permit the immediate expansion and positioning of an elastic loop through a simple downward stroke.

Consistent with the foregoing, another important object of this invention is to provide such a tool or device which includes a support adapted to receive and expand an elastic loop such as a spring as it is moved therealong, and a plunger cooperating with the support and having fingers engaging the top of the loop to press the same along the exterior surface of the support, which plunger is maintained stable by virtue of its reciprocal movement guided through cooperation between a bore in the support and a hub of the plunger. More specifically, in this connection, it is an object hereof to provide such a tool or device which incorporates a sturdy truncated frusto-conical support member having a bore extending therein and having channels extending along the periphery thereof, and a plunger member having a hub slidably received in the bore and projecting fingers or ribs cooperating with the channels on the frustro-conical support member whereby when a closed elastic loop is placed on the smaller end of the frusto-conical support member, the fingers as supported in the channel can be brought into engagement with the spring and then the hub, through an operating member or handle can be immediately depressed to force the spring along and down the frustro-conical support member by virtue of its engagement with the fingers. Even further with respect to this aspect of the invention, it is an object hereof to provide a base cooperating with the frustro-conical support member whereby a clutch or other assembly which will receive the spring or other elastic loop is positioned initially with respect to the frustro-conical support member so that the spring or other elastic loop is automatically moved to the desired location instantaneously.

The invention will be better understood, and objects other than those specifically set forth above will become apparent after reading the following detailed description. Such description makes reference to the annexed drawings presenting a preferred and illustrative embodiment of the invention.

In the drawings:

FIGURE 1 is an exploded view of an apparatus constructed in accordance herewith and presenting in phantom an element adapted to receive a closed elastic loop;

FIGURE 2 is a front view of the apparatus shown in FIGURE 1 when the same is assembled and after it has been operated to expand and position an elastic loop;

FIGURE 3 is a front view like FIGURE 2 but showing the parts of the apparatus in position which they would occupy when an elastic loop has been placed on the apparatus and is about to be expanded and positioned;

FIGURE 4 is a front view, again like FIGURE 2 but on a reduced scale like FIGURE 3, and in which parts having been broken away to expose interior components in section;

FIGURE 5 is a sectional view taken on the line 5—5 of FIGURE 3; and

FIGURE 6 is a sectional view taken on line 6—6 of FIGURE 4.

Referring first to FIGURE 1, the overall apparatus shown therein, as well as other figures, is generally designated by the numeral 10. The apparatus includes a support means and a plunger means. The support means comprises a support 12 and a base 14, whereas the plunger means comprises a plunger member 16. In brief, the plunger member 16 is adapted to engage the top of a closed loop spring 18 and move the same downwardly over the outwardly tapering peripheral surface of the support 12 so as to expand it and position it within a receiving assembly such as a centrifugal clutch generally designated by numeral 20.

To this end, the support 12 has a hollow interior 22 which takes the form preferably of an elongated bore of uniform cross section. The base of the support 12 is preferably a solid block of cylinder 24 whereby the bore terminates in spaced relation to the bottom of the support 12. Preferably, and where a spring or elastic loop is to be expanded in a circular configuration, the support 12 is a truncated frustro-conical member thus providing an outwardly tapering exterior surface extending about the hollow interior or bore 22. The exterior surface 26 is divided into a plurality of sections 26a, 26b, 26c, and 26d by a group of longitudinally extending elongated channels 28. These channels extend from the interior 22 of the support 12 through the exterior surface 26 and continue uniformly past the solid block or cylinder 24 serving as a support hub in the base potrion of the support 12.

The channels 28 have parallel sides and are preferably spaced 90° apart about the support 12 thereby dividing the exterior of the support into four sections. As explained more fully below, this permits the use of four fingers on the plunger means and insures satisfactory engagement with a spring or other elastic loop. However, the number of channels and corresponding number of engaging fingers can be varied depending upon the type of loop employed without departing from the invention.

The fingers referred to above are desingated as 30, 30a, etc., in the drawings, and these fingers project outwardly and downwardly from a hub or cylindrical block 32 forming the central portion of the plunger 16. Extending upwardly from the hub 32 is an operating member 34 comprising a shaft portion 36 and a hand-engaging head portion 38. The plunger 16 is preferably formed as an integral piece with the fingers 30, 30a, etc., taking the form of ribs which have a generally straight inner edge portion 40 and an outwardly and downwardly tapering outer edge portion 42. The fingers are solid between such edge portions so that a foot 44, preferably straight, is formed at the base thereof. Additionally, the fingers 30, 30a, etc. have a uniform thickness $d$ which is substantially the same but slightly smaller than the width $w$ of the channels 28 whereby the fingers are slidably receivable in respective corresponding channels.

Similarly, the outer diameter of the hub 32 is substantially the same but slightly smaller than the outer diameter of the bore 22 in the support 12 whereby the hub 32 is reciprocally slidable in the bore. The fingers 30, 30a, etc. project below the hub 32 of the plunger 16 by a distance L which is at least as great as the length of the block 24 in the base portion of the support 12, i.e., L is equal to or greater than L'.

While the plunger and support described above could alone be used to expand and position a spring or elastic loop, it has been found desirable to provide a base for use therewith. The base 14 preferably comprises a disc 50 having a post means 52 projecting upwardly therefrom. The post means 52 includes a first section 54 and a second section 56. As shown in FIGURE 1, the second section 56 is a threaded shaft, whereas the first section 54 is a cylindrical post of larger diameter than the threaded shaft thus providing an abutment or flange 58 at the junction between the first and second sections of the post means 52.

The threaded shaft 56 is adapted to cooperate with a threaded bore 60 extending through the block or support hub 24 at the base of the support 12 whereby the support 12 can be screwed onto the base 14. The abutment 58 receives the clutch member 20 shown in phantom and then the support 12 thereabove so that the parts are assembled for automatic proper positioning of the elastic loop or spring.

Having now described in some detail the construction of the component parts of a preferred embodiment of the device provided by the instant invention, attention can be directed to the operation thereof. In this regard, the component which is to receive the expanded elastic loop is initially positioned over the threaded shaft 56 of the base 14 and in engagement with the abutment 58 of the post means 52. If the receiving component is a cltuch means, as shown, then it may well have operating components such as pivotally mounted fingers and supports 62 (FIGURE 2) extending from the base thereof. In such instance, the abutment 58 maintains such component in spaced relation to the disc 50 so that the extending elements 62 are not damaged.

Once the receiving component has been so positioned, the support 12 is screwed onto the shaft 56, or more specifically, the hub 24 at the base of the support 12 is moved to a position where the bore 60 therein receives the threaded shaft 56 and the whole support 12 is rotated. This results in locking the base of the support 12 against the top of the loop receiving component (exemplified by clutch 20) so that a spring traveling down the support 12, or any other loop member so moved, passes directly from the base of the support 12 into a recess or other means for receiving the same.

Having assembled the base, the loop receiving component and the support 12 as described above, a loop such as the spring 18 is moved into position over the top 64 of the support 12. This results in having the spring 18 in a position on the support 12 such as shown in FIGURE 3. Following this, the plunger 16 is moved into position with the fingers 30, 30a, etc., in respective receiving channels 28. As indicated above, the fingers 30, 30a, etc., are so dimensioned that they project outwardly of the channels and thus the base edge or foot 44 of each finger engages the top of the spring 18 thereadjacent. Since the fingers cooperate with respective channels, the plunger 16 is essentially positioned as soon as the fingers are in the channels. Accordingly, once the respective components or parts have assumed the position shown in FIGURE 3, it is merely necessary to exert a downward pressure on the operating means 32 (i.e., push down on head 38) to move the spring 18 down the exterior surface of the support 12 thereby expanding the same as it moves. When the spring reaches the lower edge of the support 12 and is further pushed by the fingers 30, 30a, etc., it moves directly into the recess 70 (FIGURE 5) of the clutch member 20 or other receiving component and is then located in its desired ultimate position under the proper tension. See for example the spring 18 as finally positioned in clutch 20 in FIGURE 6. The support 12 is so dimensioned as to permit not only the ready reception of the spring as it leaves the lower end thereof but also the proper tension or expansion thereof ultimately desired. In some instances, the spring may slightly contract when it reaches its final position after leaving the lower extremity of the support 12, but this is a matter which will depend on particular circumstances and the particular receiving component.

Notwithstanding the fact that the preferred embodiment hereof contemplates the use of a post means including a threaded shaft portion, a modified embodiment of the present invention eliminates the threaded shaft portion and replaces the same by a mere smooth post or shaft and cooperating smooth bore in the support hub at the base portion of the support 12. In this instance, with proper cooperation between the parts, the support and receiving component can be easily and readily aligned in the positions described but without the necessity of the described "screw-on" operation.

It should be readily appreciated that as the device hereof is operated to move a spring or other elastic loop down the periphery of the support 12, the hub 32 of the plunger moves into the bore 22 of the support thus providing increased stability for the unit just when the forces thereon resulting from expansion of the spring or loop have increased and are continuing to increase to a significant extent. In other words, the unit insures maximum simplicity with more than adequate strength. No substantial wear of any components interfere with the operation over prolonged periods. The plunger means merely engages top portions of the loop or spring being expanded and positioned with a foot having some thickness so that no damage to the spring or loop should result from the engagement thereof. Additionally, the operator, if he so desires, can observe the expanding action of the spring to detect any faults or defects therein.

Now having presented a detailed explanation of the construction and operation of the instant invention, it should be appreciated that the objects set forth at the outset of this specification have been successfully achieved.

What is claimed is:
1. Apparatus for expanding an elastic loop member and moving the same to a given position, said apparatus comprising:
  (a) support means including a support having a hollow interior and an outwardly tapering exterior surface extending about said hollow interior, said exterior surface being adapted to receive an elastic loop member thereon in surrounding relation thereto, said support means having a plurality of elongated channels extending from said interior through said exterior surface and dividing said exterior surface into a plurality of elongated sections; and,
  (b) plunger means including a hub slidably received in said hollow interior of said support means, finger means projecting outwardly of said hub and being dimensioned to be slidably received in said channels, said finger means having at least a base portion projecting outwardly of said exterior surface and operating means extending upwardly from said hub, whereby when an elastic loop member is placed on said exterior surface of said support means, said finger means can be moved in said channels to bring the base portions thereof in engagement with the top of the loop and pressure can be applied to said operating means to force the loop along said exterior surface in the direction of outward taper thereof to expand the loop and move it to a given position.

2. The apparatus defined in claim 1 wherein said support comprises a truncated frustro-conical member having a bore therein opening to the top thereof and having longitudinally extending openings providing said elongated channels.

3. The apparatus defined in claim 2 wherein said bore is of at least substantially uniform cross section throughout its length, wherein said hub is substantially cylindrical and has a diameter substantially the same as the diameter of said bore, and wherein said finger means comprise a plurality of spaced-apart fingers projecting outwardly of and downwardly from said hub.

4. The apparatus defined in claim 3 wherein said bore terminates in spaced relation to the base of said frustro-conical member, wherein said channels extend from the top of said frusto-conical member therealong and past the position where said bore terminates and wherein said finger means comprise ribs having an outer surface tapering outwardly and downwardly of said hub.

5. Apparatus as defined in claim 1 wherein said support means includes a base member having a post means projecting upwardly therefrom and adapted to receive the base of said support thereon, said post means having abutment means thereon for receiving a member in which the spring is to be positioned in spaced relation to said base and for receiving thereabove said support.

6. Apparatus as defined in claim 5 wherein said post means comprises a first post section and a second post section, said first post section terminating in spaced relation to said base and providing an abutment at the top thereof, said second post section comprising a shaft of less diameter than said first post section, said support having a base with a bore therein adapted to be received on said shaft.

7. Apparatus as defined in claim 6 wherein said support comprises a truncated frustro-conical member having a bore therein opening to the top thereof, said bore being of at least substantially uniform cross-section throughout its length but terminating in spaced relation to the base of said frusto-conical member, wherein the base portion of said frusto-conical member includes a support hub, and wherein said channels continue uniformly along said frustro-conical member from the top to the bottom thereof past said bore and said support hub.

References Cited
UNITED STATES PATENTS 3,030,700 4/1962 Jensen _____ 29—229
3,137,932 6/1964 Erdmann _____ 29—229

CHARLES W. LANHAM, *Primary Examiner.*

L. A. LARSON, *Assistant Examiner.*